Oct. 26, 1965     T. R. LYNAM ETAL     3,213,533
METHOD OF MAKING METAL COVERED REFRACTORY BRICKS
Original Filed June 29, 1960     5 Sheets-Sheet 3
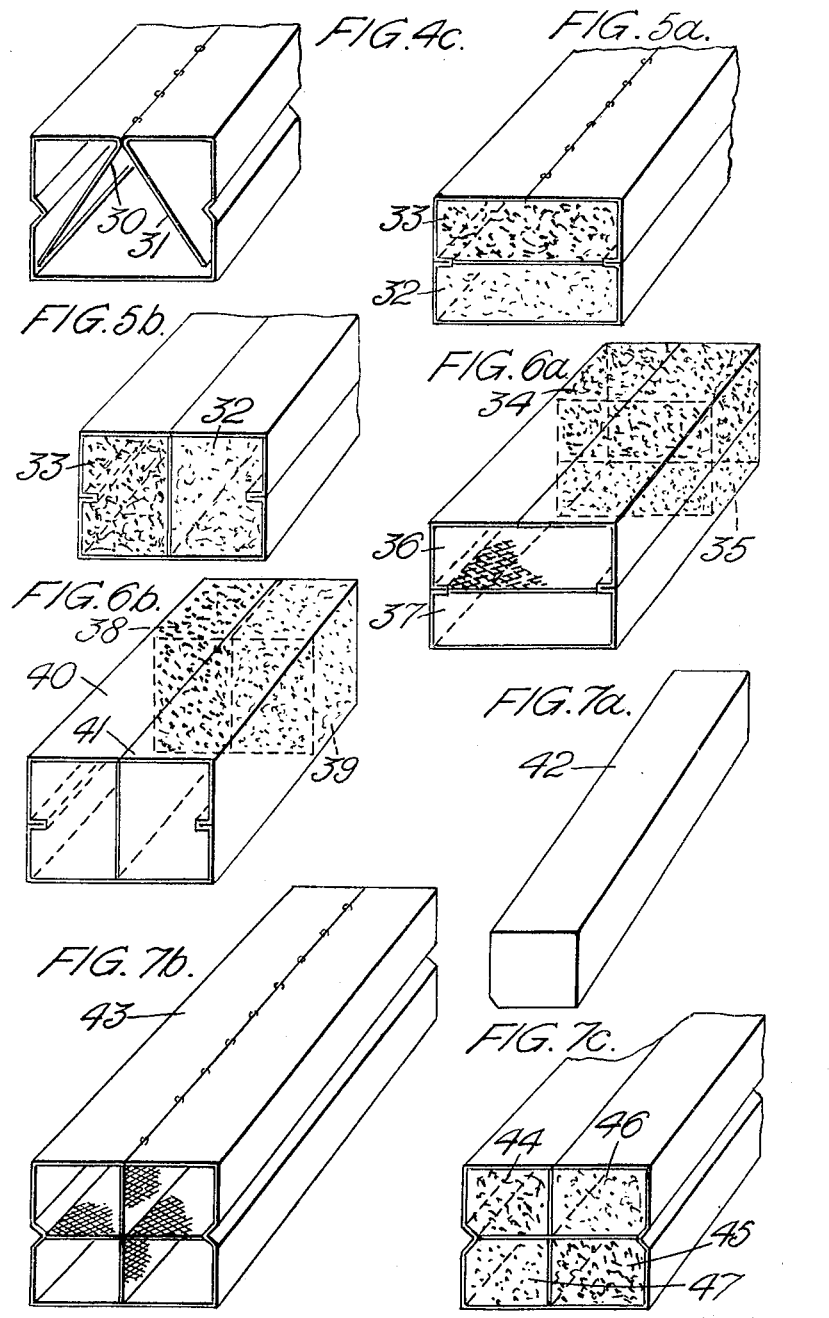
Inventors
Cyril Booth,
Christopher Stelling Hedley,
Thomas Rickman Lynam,
Eric Singleton and
William Cecil Gilpin

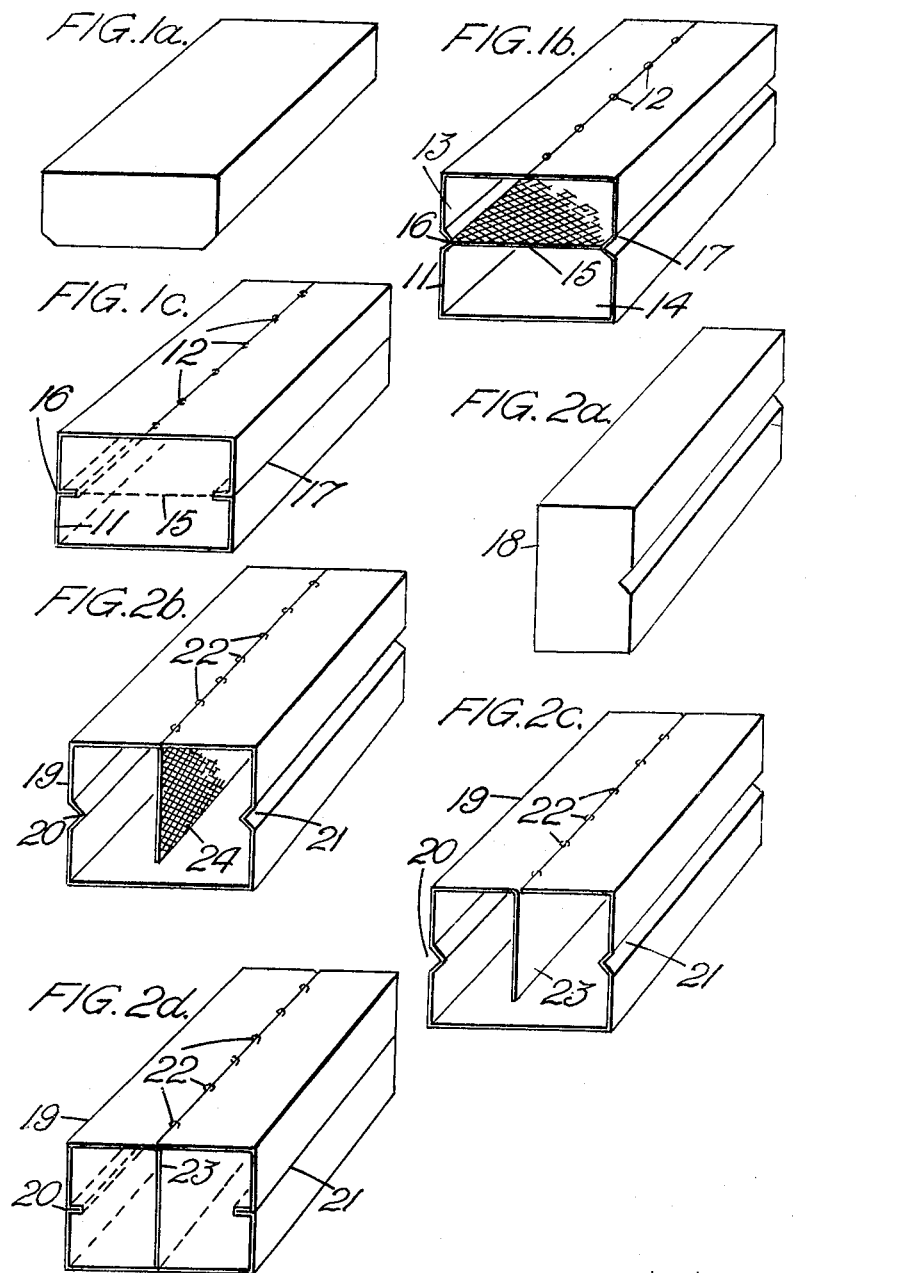

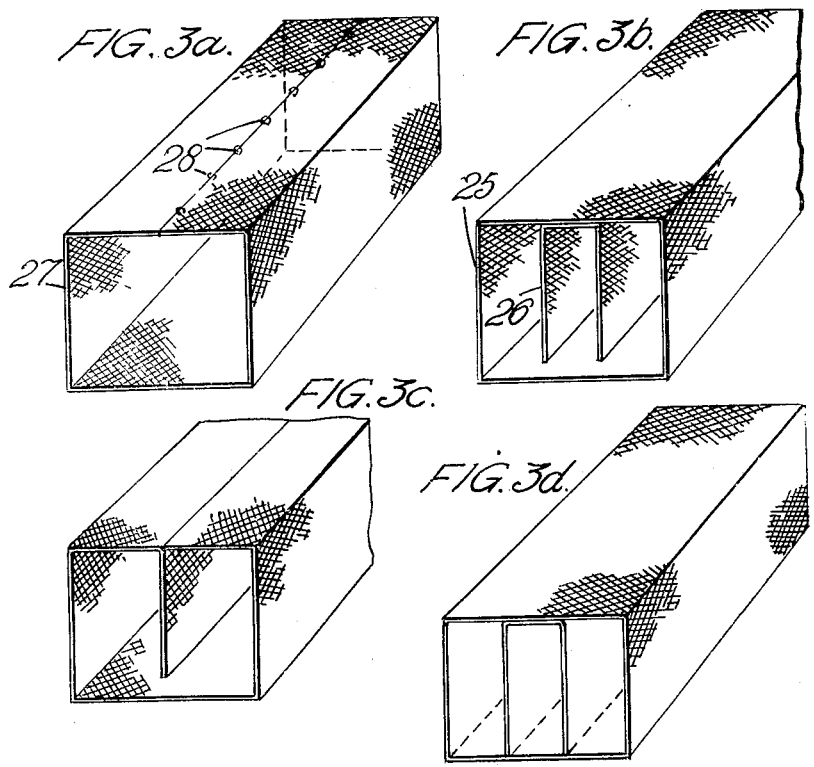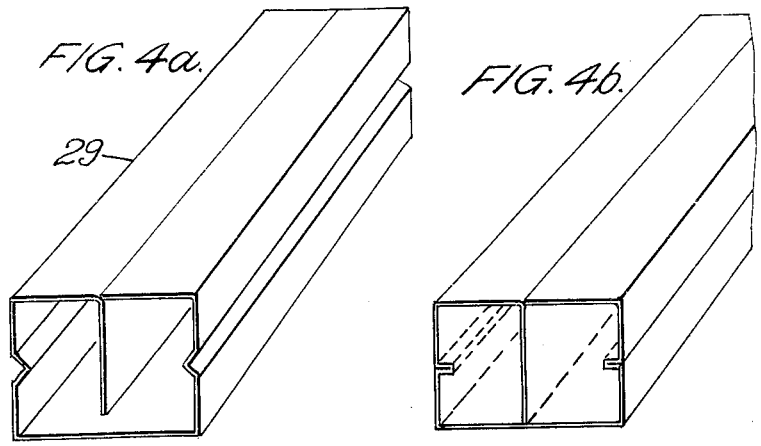

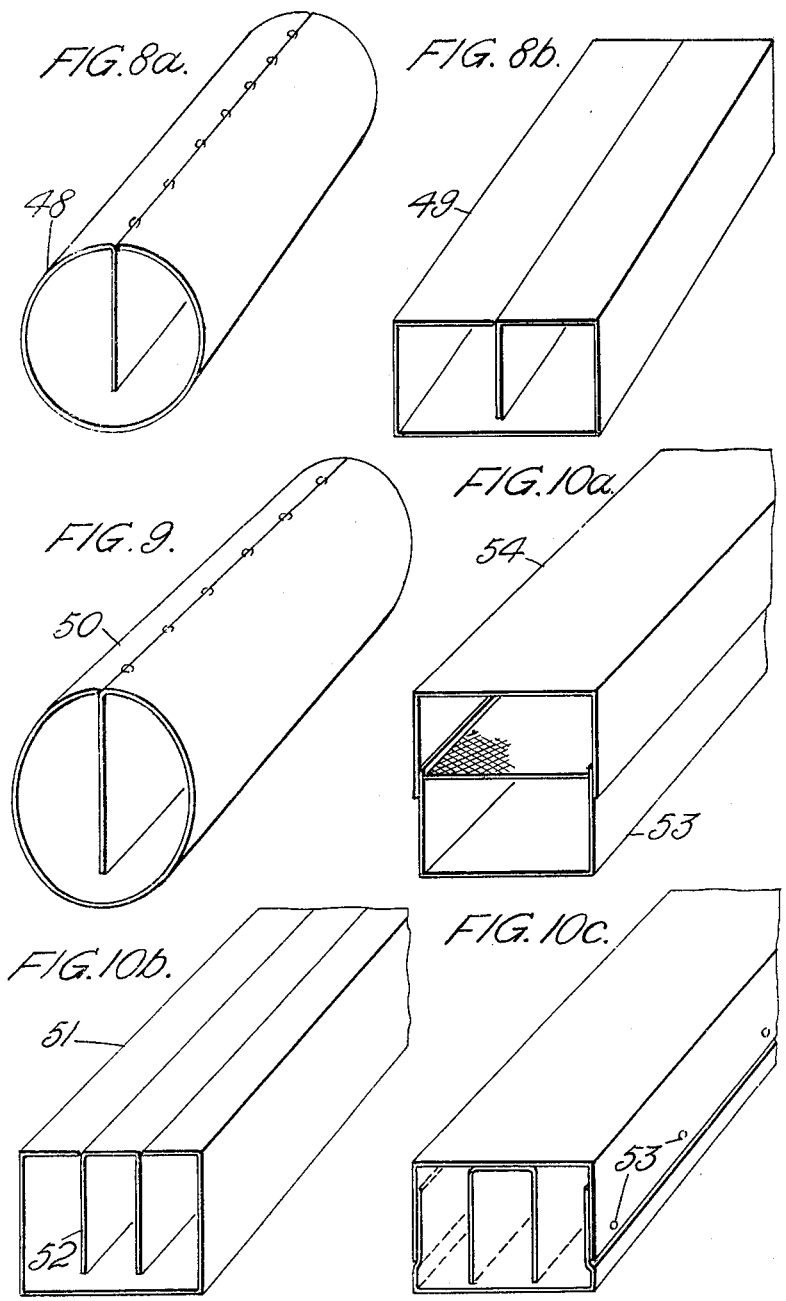

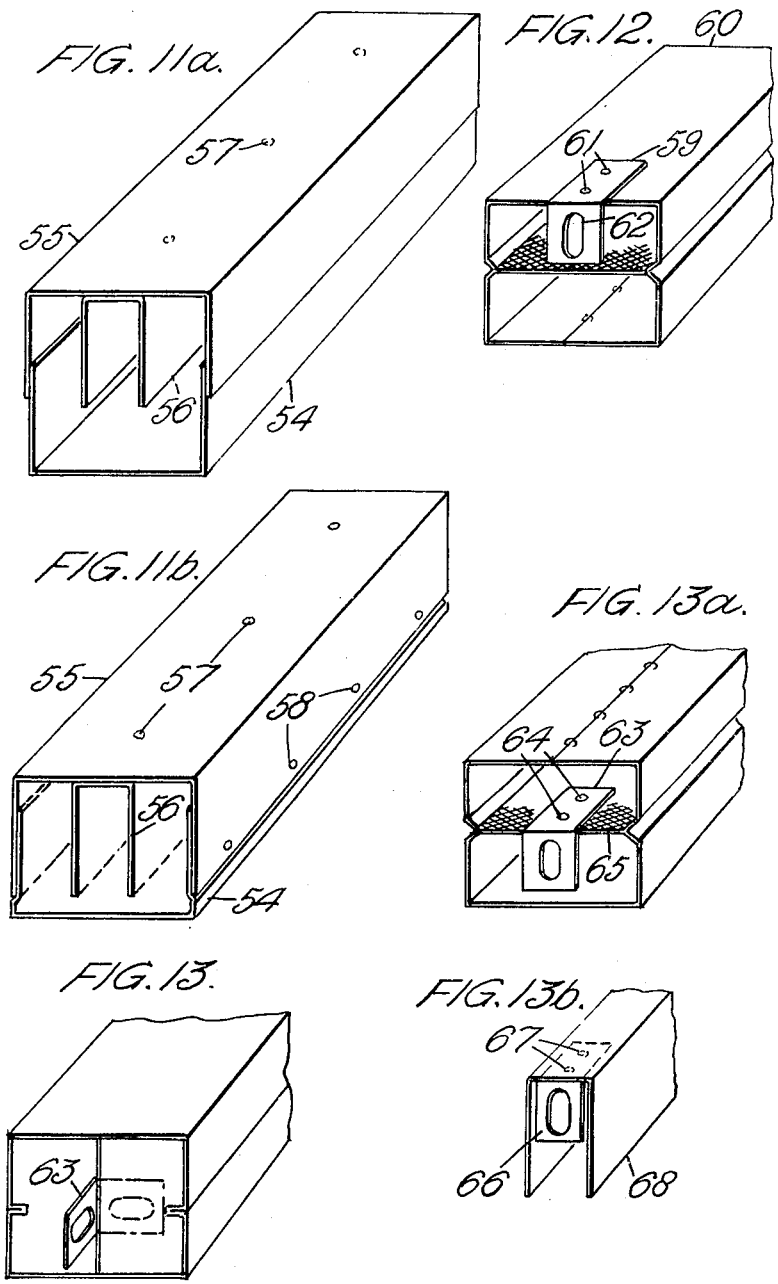

United States Patent Office 3,213,533
Patented Oct. 26, 1965

3,213,533
METHOD OF MAKING METAL COVERED REFRACTORY BRICKS
Thomas Rickman Lynam, deceased, late of Oughtibridge, near Sheffield, England, by Stanley Carter Walker, Worksop, and Emlyn Jones, Sheffield, England, executors, Cyril Booth, North Anston, near Sheffield, Christopher Stelling Hedley, Worksop, Eric Singleton, South Anston, near Sheffield, and William Cecil Gilpin, Welbeck, near Worksop, England, assignors to The Steetley Refractory Brick Company Limited, a British company
Continuation of application Ser. No. 39,536, June 29, 1960. This application June 14, 1963, Ser. No. 290,272
Claims priority, application Great Britain, July 2, 1959, 22,822/59
2 Claims. (Cl. 29—528)

This invention is a continuation of United States patent application Serial No. 39,536, now abandoned, filed June 29, 1960, and relates to refractory bricks and particularly though not exclusively to basic refractory bricks for use in open hearth steel furnaces, electric arc steel furnaces, copper refining furnaces and the like. The invention is in particular concerned with bricks for the roofs and walls of these furnaces. An object of the invention is to provide an improved metal reinforced basic brick and a method of making the same. A further object is to provide a basic brick with enhanced heat insulating properties and to effect an economy in the use of relatively expensive raw materials such as dead-burned magnesite and chrome ore of which such bricks are made Basic refractory bricks encased in metal plates or formed in metal tubes have been used for a number of years in the construction of furnace structures. Additionally, basic bricks having internal metal reinforcement have been similarly used, as have bricks with metal cases and internal metal reinforcement. Various reasons have been proposed for the use of metal plates but it is at present thought that metal, in particular iron or steel in the form of plates, has three main functions.

(1) To strengthen the brick in the line of its principal dimension and thereby to increase its ability to carry load in a refractory brick structure by reason of the load being supported to a large extent by the metal case and not by the refractory filling. Also to strengthen the brick in the region where the material of the brick is weak by virtue of its temporary, fugitive, or chemical bond having been destroyed by heat which is insufficient to develop the ceramic bond of the brick.

(2) To divide up the cross section of the brick so that the area of refractory is reduced and in this way to reduce the tendency towards slabbing off of the hot face in pieces an inch or so thick, a phenomenon known as shelling.

(3) In so far as the external plates are concerned, for the plates to oxidise and to form iron oxide which combines with the material of the brick to give additional refractory substance between the bricks and uniting strongly with them thereby to cause the structure of which the bricks form part to become monolithic.

An important reason for the use of metal cases and metal reinforcements is to provide a refractory brick which does not require to be kiln fired before use and is capable of giving satisfactory service in metallurgical furnaces. The necessary strength is then best achieved when the brick is completely encased and supported by steel in the form of a tube or of a box section. Tubes and box and other sections have been used in the past and have been filled with refractory material by ramming from the open end. With this technique it is difficult to achieve the necessary degree of consolidation of the refractory material within the tube and as a result structures built in this way while having the advantage of the supporting effect of the continuous steel sections, tend to fail due to the shrinkage of the refractory material within the sections as a result of the unsatisfactory consolidation.

To overcome this difficulty a number of other methods of reinforcing bricks have been proposed. Thus, one method has been to place an oxidisable U shaped iron or steel channel section with the base of the U downwards on the lower die of a mould, to fill the mould with refractory material, to place a second U channel section on this material with the base of the U uppermost and to apply pressure through the upper die or dies whereby a pressed brick is produced having metal on the longitudinal faces. In a modification of this method the U shaped sections may have inwardly extending metal projections which upon pressing are embedded in the brick. Alternatively, the U shaped metal plates may have further metal plates fixed to them and at right angles to the base of the U, these additional plates becoming embedded in the brick during pressing.

According to the present invention there is provided a method for producing metal reinforced refractory bricks, blocks or like units which method comprises filling a metal case which can be compressed in at least one direction with refractory material and subjecting the case containing the compacted material to pressure in a mould.

The refractory material may either be compacted after being filled into the metal case or the refractory material may be lightly pressed to form shapes or soaps which are then placed in the metal case.

When the bricks are basic refractory bricks the case is preferably made of iron or steel.

The refractory material may be compacted in the metal case for example by ramming, or vibrating.

The metal case may be provided with one or more partial or complete internal divisions made of metal, these additional divisions e.g. of iron or steel sheets becoming embedded in the refractory material and forming an internal reinforcement of the brick.

The metal cases can be made of sheet metal or, where it is desired to restrict the amount of iron or steel in the reinforcing structure, they can be made of perforated or expanded metal. When expanded metal is employed it is preferred to use flattened expanded metal. Solid sheet metal cases are provided with a device such as one or more inwardly facing crimps which are compressible in the direction of pressing. Expanded or suitably perforated metal sheets can be used without a device of this kind and expanded metal fabricated in such a way that the pressure is applied to the "short" way of the mesh is particularly suitable for the present purpose as it compresses readily.

The internal reinforcement may also consist of solid, perforated or expanded metal sheet. Alternatively the internal reinforcement may take other suitable forms. The reinforcement may be attached to the external case or may be formed as an integral part of it. For example, a rectangular sheet of solid, perforated or expanded metal can be bent five times at right angles to form a rectangular box with an internal longitudinal division. One free edge of the metal casing (running parallel with the folds) may be welded or otherwise attached to the final fold. If the internal sheet is made of perforated or expanded metal and has its plane in the direction in which it is intended to compress the brick it is preferable that it does not reach fully from one face of the case to the other but stops short by a distance approximately equal to the expected compression. This is essential when a solid metal sheet or other reinforcement which is not readily compressible is used in place of perforated or expanded sheet. It is not essential to form the cases and the internal reinforcement from one piece of metal but two or more may be used according to the most convenient means and to the materials and equipment available. Similarly, the number of divisions or internal reinforcements is not limited to one. The cases are not confined to rectangular shapes although it is an advantage of the present invention particularly when using perforated or expanded metal cases to make them initially rectangular in shape and to bring them subsequently to the necessary wedge shape for example during compression.

The thickness of the metal sheet (solid, perforated or expanded) may also be varied according to the shape and size of the brick and the purpose for which it is to be used. The case should however be strong enough to hold the refractory material with which it is to be filled without distortion although the case can be supported in a mould (for example of wood) during filling and compacting and it is desirable to do this when it is of perforated or expanded metal having a particularly open form and one which might not readily hold the filling. For this purpose the mould should have one side hinged or be made in two or more parts so that it may be opened to discharge the refractory filled case.

One advantage of the present invention is that segregation of the constituents of the refractory material and lamination of the bricks can be reduced. This is achieved because when filling the case, material can be added in increments, each increment being partially compacted before the next is added. A further advantage of the invention is that a composite brick can be made, i.e. one consisting of two or more different but compatible refractory materials. In this way one of the most serious disadvantages of basic bricks and especially of those containing magnesia, namely high thermal conductivity can to a large extent be overcome. For example, a rectangular metal case of "standard" brick dimensions approximately 9" x 4½" x 3" can be filled from one end i.e. through one of the 4½" x 3" faces, a proportion of a refractory material of a kind having low thermal conductivity being first introduced and partially compacted and the filling then completed with a refractory material of a different kind and the whole then pressed to form the composite brick. In this way a 9" x 4½" x 3" brick can be made having 2" of its length of chrome ore and the remaining 7" of its length of a mixture of chrome ore and magnesia. Alternatively, the invention affords an economy in the use of expensive materials. Thus, it is commonly necessary to dismantle many furnace structures when only part of the refractory bricks of which they are formed is worn away. In a structure say 15" thick such as the roof of an open hearth steel furnace and consisting of wedge shaped refractory bricks 15" long it is usually necessary to make a renewal or repair when only some eight to ten inches of the bricks have been worn away and frequently the remainder of the brick after demolition is so contaminated as to be useless and even if not contaminated can rarely be used economically. With the greater purity and higher cost of the refractory materials at present being used this represents a serious expense but the present invention allows of this expense being substantially reduced by making an appropriate proportion of the brick in the purer more refractory and more expensive material and the remainder in a less pure or less refractory and less expensive material. The proportions are in no way fixed but can be adjusted to suit the materials to be used and the conditions of service under which the finished bricks are to be employed.

It will be understood that in the production of neutral and acid bricks the cases and internal reinforcement will not generally be made of iron or steel but of metals more compatible with acid and neutral refractory materials.

In the accompanying drawings, we have shown certain present preferred embodiments of the invention and have illustrated certain present preferred methods of practicing the same in which FIGURE 1a is an isometric view of a refractory soap suitable for use in the practice of this invention;

FIGURE 1b is an isometric view of a metal case suitable for use in practicing the invention having inwardly facing deformable crimps;

FIGURE 1c is an isometric view of the metal case shown in FIGURE 1b wherein the crimps have been collapsed;

FIGURE 2a is an isometric view of another refractory soap suitable for use in the invention;

FIGURE 2b is an isometric view of another metal case suitable for use in the invention;

FIGURE 2c is an isometric view of yet another metal case suitable for use in the invention;

FIGURE 2d is an isometric view of the metal case shown in FIGURE 2c wherein the crimps therein have been collapsed;

FIGURE 3a is an isometric view of an expanded metal case suitable for use in the invention;

FIGURE 3b is a partial isometric view of another expanded metal case suitable for use in the invention;

FIGURE 3c is a partial isometric view of still another expanded metal case suitable for use in the invention;

FIGURE 3d is an isometric view of the expanded metal case of FIGURE 3b after being compressed in a mold;

FIGURE 4a is an isometric view of yet another metal case suitable for use in the invention;

FIGURE 4b is a partial isometric view of the metal case shown in FIGURE 4a with the crimps therein collapsed;

FIGURE 4c is a partial isometric view of still another metal case suitable for use in the invention;

FIGURE 5a is a partial isometric view of another embodiment of the invention;

FIGURE 5b is a partial isometric view of still another embodiment of the invention;

FIGURE 6a is an isometric view of still another embodiment of the invention;

FIGURE 6b is an isometric view of another embodiment of the invention;

FIGURE 7a is an isometric view of another refractory soap suitable for use in the invention;

FIGURE 7b is an isometric view of another metal case suitable for use in the invention;

FIGURE 7c is a partial isometric view of another embodiment of the invention;

FIGURE 8a is an isometric view of a metal case;

FIGURE 8b is an isometric view of the metal case shown in FIGURE 8a after being pressed in a die;

FIGURE 9 is an isometric view of a metal case;

FIGURE 10a is a partial isometric view of a metal case;

FIGURE 10b is a partial isometric view of a metal case;

FIGURE 10c is a partial isometric view of a metal case;

FIGURE 11a is an isometric view of a metal case;

FIGURE 11b is an isometric view of a metal case;

FIGURE 12 is a partial isometric view of a metal case suitable for use in the invention;

FIGURE 13 is a partial isometric view of a metal case suitable for use in the invention;

FIGURE 13a is a partial isometric view of a metal case suitable for use in the invention; and FIGURE 13b is a partial isometric view of a reinforcement suitable for use in the invention.

Following is a description by way of example and with reference to the accompanying drawings of refractory bricks made in accordance with the present invention.

*Example 1*

A sufficient quantity of a suitable refractory mix, to give a compressed brick of the dimensions shown in FIGURE 1c was used to make two lightly pressed shapes or soaps of the dimensions shown in FIGURE 1a by hand ramming in a suitable mould. Alternatively, they may be formed in a suitable mechanical or hydraulic press.

A metal 11 to contain the shapes was made by bending a sheet of mild steel of suitable gauge to the shape and dimensions shown in FIGURE 1b and welding the two butting edges as shown at 12.

The two lightly pressed shapes or soaps 13 and 14 with a reinforcing sheet 15 of flattened expanded mild steel between them were inserted into the metal case 11. The whole was then inserted in a suitable die and compressed to the desired dimensions shown in FIGURE 1c. The completed brick was then removed from the die and was ready for use.

The expanded mild steel sheet 15 may be replaced by as solid or perforated sheet of mild steel, mild steel grid or reinforcing rods of mild steel as desired and these may be tack welded if desired to one or both of the indentations or crimps 16, 17. This central sheet 15 may carry a tab or hanger as shown in FIGURE 12 for suspension of the brick. Alternatively if desired a tab can be affixed to the outer mild steel case 11 as shown in FIGURE 13.

*Example II*

Lightly pressed shapes or soaps 18 as shown in FIGURE 2a were made by the method outlined in Example I and were inserted into a metal case 19 formed with integral plate reinforcement as shown in FIGURE 2c from a rectangular sheet of mild steel by bending five times at right angles, crimping at 20 and 21 and welding at 22. The integral insert 23 was of a length such that it did not deform when the case was compressed. The whole was then inserted into a die and compressed to the dimensions shown in FIGURE 2d.

The integral plate reinforcement 23 may be replaced if desired by expanded mild steel sheet 24 as shown in FIGURE 2b. This need not be less than the finished depth of the brick as it can deform during compression. As for Example I suspension tabs may be provided as shown in FIGURES 12 and 13 and rods or grids may be used for reinforcement if desired.

*Example III*

A lightly pressed shape or soap 25 of suitable refractory mix to give the desired dimensions on full compression was prepared as illustrated in FIGURE 3b with a U shaped reinforcement 26 of expanded mild steel incorporated during pressing.

This shape was inserted in a mild steel case 27 of expanded metal FIGURE 3a with the longest axis of the mesh perpendicular to the compression direction and spot welded at 28. The whole was compressed in a die to the desired dimensions shown in FIGURE 3d.

If desired, the reinforcement of this shape may consist of a solid or perforated sheet of mild steel shaped to a U section or integral reinforcement, as in Example II, may be employed by an extension of the expanded metal casing of FIGURE 3a as shown in FIGURE 3c. In this latter modification of Example III two lightly pressed shapes or soaps are required.

Suspension tabs may be incorporated in accordance with FIGURES 12 and 13.

*Example IV*

A case 29 of the dimensions shown in FIGURE 4a was filled from one end with small increments of a refractory mix. Each increment was compacted using a hand rammer and the process continued until the case was filled with the hand-compacted material. The whole was then placed in a die and compressed to the dimensions shown in FIGURE 4b.

Suspension tabs may be attached to the case if desired according to FIGURE 12.

The internal reinforcement may be varied as shown in FIGURE 4c utilizing the two ends 30 and 31 of the plate used to form the case.

This example may be carried out using an expanded metal case and in this modification an outer container is used to prevent loss of material through the mesh during the initial ramming process. Suspension tabs may be used as previously indicated.

*Example V*

The invention was used in this example to form composite refractory bricks such as that shown in FIGURE 5 using two dissimilar brick compositions in order to take advantage of any enhanced properties which result from the use of such a brick for example in open hearth furnace roofs, using chrome/magnesite mixtures 32 and magnesite 33. This example was carried out as for Examples I, II and III (c) except that two shapes or soaps of differing compositions were inserted in the case before final compression. Suspension tabs may be used as previously indicated.

*Example VI*

Composite bricks using materials of differing composition and differing physical properties for the purposes set out earlier in the specification were formed as shown in FIGURES 6a and 6b essentially by the methods described in Examples I, II and III (c) except that four shapes 34, 35, 36 and 37 (FIGURE 6a) and 38, 39, 40 and 41 (FIGURE 6b) were required for each brick and by the method of Example IV in which two separate refractory mixes were rammed into the case.

A suspension tab was affixed to the case.

*Example VII*

Composite refractory bricks using four lightly pressed shapes or soaps 42 of two differing compositions FIGURE 7a were inserted in a case 43 as shown in FIGURE 7b to give a finished brick as shown in FIGURE 7c in which shapes 44 and 45 are of magnesite and shapes 46 and 47 are of chrome magnesite or magnesite chrome.

This brick has the known advantage due to the mixed composition indicated in Example V together with the further advantage that the chequer construction is continued along ring courses irrespective of the orientation of adjoining faces of similar dimensions.

*Example VIII*

A cylindrical case 48 of the dimensions indicated in FIGURE 8a was filled with refractory material according to the method of Example IV. The whole was then pressed in a suitable die to give a rectangular brick 49 of the dimensions shown in FIGURE 8b.

The advantage of the method of this example is that the surface area of the cylinder containing a certain volume is less than that for a rectangular section of the same volume. Thus in the case of a compressible filling such as is used in the invention it is possible to have a case without indentations or crimps.

*Example IX*

The brick produced to the method of Example VIII from a case 4½" in diameter was less than 3" in thickness, and in the present example it was found necessary to use an oval case 50 of the dimensions shown in FIGURE 9 in order that the filled case could be inserted in a die of 4½" width.

In both Examples VIII and IX there was a slight stretching of the cases during compression.

Suspension tabs may be fixed to bricks made in accordance with the examples using the methods indicated in FIGURES 12 and 13. FIGURE 12 shows a tab 59 consisting of a right angled strip of sheet steel secured to the metal case 60 of a brick by spot welds 61, one limb of the tab lying along a long face of the casing (preferably that opposite to the face to which the spot welds are applied to complete the casing) and the other (which may be perforated at 62 to take the supporting means) along an end of the brick. This latter is bent out at right angles from the brick when required for use.

FIGURE 13a shows a tab 63 (similar to tab 59 of FIGURE 12) spot welded at 64 to the expanded metal reinforcement 65. FIGURE 13b shows a similar tab 66 spot welded at 67 to a U shaped reinforcement 68.

It will be seen from the proportions of the casings, shapes and bricks shown in the drawings that in general the degree of compression of the casing which takes place when carrying out the method of the present invention is of a minimum order of about 20 percent.

The foregoing examples describe the manufacture of rectangular bricks but it will be understood that bricks of other shapes e.g. tapered bricks can be produced using suitable metal cases and soaps and dies. Where the taper is not more than 1/8" on a 9" length and the taper is parallel to the direction of any crimp or long direction of expanded metal mesh, rectangular cases may be used with suitably tapered lightly pressed shapes.

We claim:
1. A method of making a metal-cased refractory unit comprising the steps of
    (a) filling with refractory material an open-ended metal case having inwardly-facing deformable crimps extending along the full lengths of opposite sides thereof; and
    (b) collapsing said crimps by applying pressure to said case in a mould in a direction coincident with the planes of the crimp containing sides and at right angles to the length of said crimps and thereby decreasing the volume of said case and compressing said refractory material contained within the case.

2. A method of making a metal-cased refractory unit comprising the steps of
    (a) filling with refractory material an open-ended case of expanded metal; and
    (b) partially deforming said case by applying pressure to said case in a mould in a direction perpendicular to the length of the case and coincident with the planes of two opposite sides of said expanded-metal case and at least partially closing up the openings in the expanded metal of said opposite sides to thereby decrease the volume of said case and compress the refractory material contained within the case.

References Cited by the Examiner

UNITED STATES PATENTS

| | | | |
|---|---|---|---|
| 1,090,171 | 3/14 | Schisler | 189—37 X |
| 1,615,815 | 1/27 | Birdsey | 52—725 X |
| 2,099,470 | 11/37 | Coddington | 52—376 |
| 2,104,506 | 1/38 | Coddington | 52—376 |
| 2,216,813 | 10/40 | Goldschmidt | 52—596 |
| 2,247,376 | 7/41 | Heuer | 52—599 X |
| 2,791,116 | 5/57 | Heuer et al. | 52—599 |
| 2,901,990 | 9/59 | Hutter | 110—99 |
| 3,100,677 | 8/63 | Frank et al. | 264—294 |

FOREIGN PATENTS

| | | |
|---|---|---|
| 1,233,990 | 5/60 | France. |
| 830,320 | 2/52 | Germany. |
| 638,767 | 6/50 | Great Britain. |
| 678,637 | 9/52 | Great Britain. |
| 690,356 | 4/53 | Great Britain. |
| 690,898 | 4/53 | Great Britain. |

FRANK L. ABBOTT, *Primary Examiner.*

HENRY C. SUTHERLAND, JACOB L. NACKENOFF, *Examiners.*